(12) United States Patent  
Carley

(10) Patent No.: US 6,542,735 B1  
(45) Date of Patent: Apr. 1, 2003

(54) METHOD OF SETTING SECURITY CODES IN A CORDLESS TELEPHONE SYSTEM WITH MULTIPLE COMMUNICATION DEVICES

(75) Inventor: Jeffrey A. Carley, Colo. Spgs., CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/440,345

(22) Filed: Nov. 15, 1999

(51) Int. Cl.[7] .......................... H04Q 7/20; H04M 1/66; H04M 1/68; H04M 3/16
(52) U.S. Cl. .......................... 455/420; 455/411; 455/88
(58) Field of Search .............................. 455/410, 411, 455/462, 463, 418, 419, 420, 88, 465; 340/5.22, 5.5; 380/247, 270, 273; 379/188, 446

(56) References Cited

U.S. PATENT DOCUMENTS

| | | | | |
|---|---|---|---|---|
| 4,593,155 A | * | 6/1986 | Hawkins ..................... | 455/411 |
| 4,736,404 A | * | 4/1988 | Anglikowski et al. ...... | 379/188 |
| 5,476,157 A | * | 12/1995 | Todaro ........................ | 187/280 |
| 5,689,549 A | * | 11/1997 | Bertocci et al. ............ | 455/410 |
| 5,828,956 A | * | 10/1998 | Shirai ......................... | 455/411 |
| 6,185,410 B1 | * | 2/2001 | Greene ........................ | 455/100 |
| 6,236,868 B1 | * | 5/2001 | Lygas .......................... | 379/446 |

* cited by examiner

Primary Examiner—Nguyen T. Vo

(57) ABSTRACT

A method of setting security codes in a remote communicating device using a base unit in a cordless telephone system includes the steps of bringing the remote communicating device into electrical contact with the base unit, wherein the base unit stores a transmitting security code (TC) and a receiving security code (RC), different from the TC; determining whether the remote communicating device is either a remote receiving device (RRD), a remote transmitting device (RTD), or a remote combination transmitting/receiving device (RCD); setting the remote communicating device with the RC if the remote communicating device is the RRD, or the TC if the remote communicating device is the RTD, or both the RC and the TC if the remote communicating device is the RCD, as determined above, said setting done via the electrical contact with the base unit; and verifying the RC or TC or both the RC and the TC in the RRD, RTD, or RCD, respectively, as determined above, said verifying done via the electrical contact with the base unit. The RC is selectable at the base unit by a user, thereby setting the same selected RC each time the RRD or the RCD is set, and the TC is automatically randomized by the base unit, thereby setting a different TC each time the RTD or the RCD is set.

17 Claims, 3 Drawing Sheets

METHOD OF SETTING SECURITY CODES IN A CORDLESS TELEPHONE SYSTEM WITH MULTIPLE COMMUNICATION DEVICES

BACKGROUND OF THE INVENTION

1. Field of the Invention

The present invention relates generally to a cordless telephone system, and more particularly to a method of setting security codes in a cordless telephone system having one or more communicating devices.

2. Discussion of the Related Art

Cordless telephone systems generally include a base unit and a handset which communicate using Radio Frequency (RF) signals. The base unit is connected to a telephone network, such as the Public Switched Telephone Network (PSTN), while the handset can be removed from the base unit and used within a predetermined range, which is limited by the RF signal strength and not cord length. The transmission from the handset to the base unit is typically on a different frequency than the transmission from the base unit to the handset, providing duplex communications.

Existing cordless telephone systems offer additional conveniences over conventional corded phones, such as mobility, and currently a convenient method of transmitting the voice of a person or speaker, referred to hereinafter as a presenter, to a telephone network to conduct a clear telephone conversation in a conference room or auditorium setting is set forth in co-pending U.S. patent application Ser. No. 09/433,530 to Carley, filed on Nov. 4, 1999, which is incorporated herein by reference. Speakerphones may of course also be used for this purpose, however, speakerphones are often less than ideal because they restrict the movement of the presenter, who may not always want to stay near the speakerphone. In addition, speakerphones will often pick-up considerable background noise in a conference room or auditorium setting.

A presenter could carry a corded telephone handset or a cordless telephone handset to transmit the presenter's voice to a telephone network while moving around, but this is usually not practical because it substantially restricts the ability of the presenter to use his or her hands for other purposes. Additionally, the presenter's audience cannot hear the telephone conversation when a handset is used.

Where a sound system is being used to broadcast the presenter's speech, the system can, in theory, be connected to a telephone line, but this is often difficult, expensive or otherwise impractical. Also, a telephone jack may not be available in many auditoriums or conference rooms.

For all of the above reasons, cordless telephone systems with multiple transmitting and receiving communicating devices have been suggested. For example, a cordless telephone system may include as a transmitting device, a cordless microphone, and as receiving devices, cordless speakers, and as combination transmitting/receiving devices, a cordless headset and a sound system interface, all wishing to communicate with a common base station. In order to minimize the cost of such a cordless telephone system, each communication device is designed for relatively simple simplex RF communications. The combination transmitting/receiving devices can conceptually be treated as separate transmitting and receiving devices in one unit. Multiple receiving devices and only one transmitting device communicate with the base unit at a given time.

In maintaining a simpler, cost effective design, there is a need to synchronize the communication between multiple communicating devices and the base unit. Given the fixed amount of radio spectrum, only a relatively small portion has been allocated to cordless telephones. Cordless telephone systems operate on a selected band of a relatively few channels. The base unit and the communicating device are set to the same channel for communication. The likelihood is high that a particular location may be undesirably within the communication range of more than one cordless telephone user on the same channel. Given the relative density of urban and suburban areas, and the desirability of having a cordless phone system with sufficient communication range to allow its use within a reasonable proximity of the base unit, a number of cordless telephone users in a given neighborhood may find themselves causing RF interference with nearby cordless telephone systems. Given also the relatively small number of channels used for cordless telephones, it is also relatively simple for a person to select a channel on his cordless telephone which is the same as the channel of another user.

For these reasons, it is common to employ a security code in cordless telephone systems. Thus, in addition to selecting one of a relatively small number of channels, a cordless telephone user is able to establish a security code, much like a security code is established by persons utilizing remote control garage door openers on a common frequency. This technique guards, at least to a certain extent, against the possibility of unintentional or unauthorized access to a user's telephone conversation.

It is desirable to set the security code in the communicating devices by temporarily bringing them into contact with the base unit. U.S. Pat. No. 4,731,813 describes a cordless telephone system in which a single security code is communicated between the base unit and the handset by modulating the charging current supplied to the handset from the base unit. However, there are additional considerations where a cordless telephone system includes multiple communicating devices, since all receiving devices must be set to a receiving security code common with the base unit and only one transmitting device may contain the same transmitting security code, which is different from the receiving security code to prevent interference with the base unit.

Therefore, a need exists for a method of setting a transmitting security code and a receiving security code, different from the transmitting security code, in remote communicating devices in a low cost cordless telephone system with multiple remote communicating devices.

SUMMARY OF THE INVENTION

It is therefore an object of the present invention to provide a method of setting a transmitting security code and a receiving security code, different from the transmitting security code, in remote communicating devices in a low cost cordless telephone system with multiple remote communicating devices.

It is another object of the present invention to provide a method of setting a receiving security code in remote receiving devices in a low cost cordless telephone system with multiple remote communicating devices so some or all receiving devices may be set to the same receiving security code as the base unit.

It is still another object of the present invention to provide a method of setting a transmitting security code in remote transmitting devices in a low cost cordless telephone system with multiple remote communicating devices so only a selected one transmitting remote communicating device and the base unit are set to the same transmitting security code.

To achieve the above objects, a method of setting security codes in a remote communicating device using a base unit in a cordless telephone system in accordance with the present invention is provided which includes the steps of bringing the remote communicating device into electrical contact with the base unit, wherein the base unit stores a transmitting security code (TC) and a receiving security code (RC), different from the TC; determining whether the remote communicating device is either a remote receiving device (RRD), a remote transmitting device (RTD), or a remote combination transmitting/receiving device (RCD); setting the remote communicating device with the RC if the remote communicating device is a RRD, or the TC if the remote communicating device is the RTD, or both the RC and the TC if the remote communicating device is the RCD, as determined above, said setting done via the electrical contact with the base unit; and verifying the RC or TC or both the RC and the TC in the RRD, RTD, or RCD, respectively, as determined above, said verifying done via the electrical contact with the base unit.

The RC is selectable at the base unit by a user, thereby setting the same selected RC each time the RRD or the RCD is set, and the TC is automatically randomized by the base unit, thereby setting a different TC each time the RTD or the RCD is set.

BRIEF DESCRIPTION OF THE DRAWINGS

The above and other objects, features and advantages of the present invention will become more apparent in light of the following detailed description of an exemplary embodiment thereof taken in conjunction with the attached drawings in which.

DETAILED DESCRIPTION OF THE PREFERRED EMBODIMENTS

Figure 1:
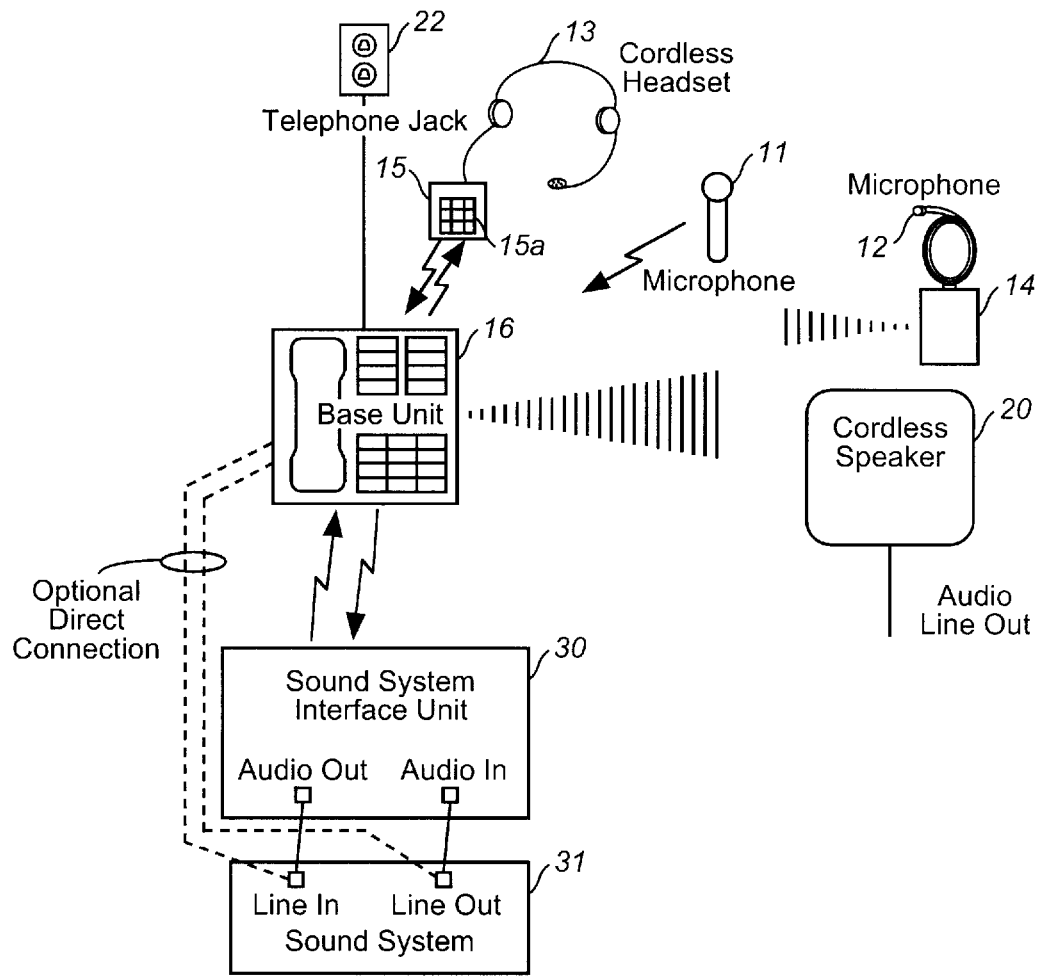
FIG. 1 illustrates a cordless telephone system which uses a method of setting security codes in accordance with the present invention.

Turning now to the drawings, in which like reference numerals identify similar or identical elements throughout the several views, FIG. 1 illustrates a cordless telephone system 10 comprising a microphone 12, transmitter 14, and base unit 16. System 10 may include a cordless speaker 20, sound system interface unit (SSUI) 30, handheld/standheld cordless microphone 11 and cordless headset 13 that may optionally be used in system 10, and a telephone jack 22 for connecting base unit 16 to a telephone network, such as the PSTN. Generally, microphone 12 is adapted to be worn by an individual or, more clearly, a presenter, such as a lapel type microphone, and is used to receive acoustical signals from the presenter and to convert the acoustical signals to corresponding electrical audio signals. The transmitter 14 is also adapted to be worn by the presenter and is electrically connected to the microphone 12 via wire to receive the electrical audio signals, to convert the electrical audio signals to RF signals, and to transmit the RF signals. Similarly, a handheld or standheld cordless microphone 11 may also be used, with an integrated transmitter in the body of the microphone.

The base unit 16 is remote from the microphone 12 and the transmitter 14; that is, the base unit 16 is not physically connected to either the microphone 12 or the transmitter 14. The base unit 16 receives the RF signals from the transmitter 14 on a receiving frequency and converts the RF signals to telephone network electrical signals corresponding to the acoustical signals from the presenter. Also, the base unit 16 is connected to a telephone network via the telephone jack 22 to transmit the telephone network signals to the network and to receive telephone network signals from the network that correspond to other audible telephone communications. The base unit 16 optionally includes a built in speaker to broadcast the telephone conversation.

The cordless speaker 20 is remote from the base unit 16, microphone 12 and transmitter 14. When the cordless speaker 20 is used in system 10, the base unit 16 must include a base unit transmitter, similar to the transmitter 14 for the microphone to transmit RF signals on a transmit frequency, different from the receive frequency, to the cordless speaker. The telephone base unit transmitter transmits RF signals representing the telephone communications received by the telephone base unit 16 from the telephone network and also, optionally, the RF signals corresponding to the acoustical signals received from the presenter. The cordless speaker 20 converts the received RF signals into electrical audio signals to broadcast them over the speaker. Additionally, the cordless speaker 20 includes an 'audio out' jack to facilitate connection to a conventional sound system 'line in' jack via a cable, thereby providing corresponding electrical audio signals to the sound system as well and allowing the telephone conversation to be heard over the sound system throughout a larger area.

The base unit 16 may be a typical cordless telephone base, preferably with speakerphone capabilities. However, in lieu of the cordless handset, the base unit 16 receives signals from the cordless microphone 12, via transmitter 14, or microphone 11, via its built-in transmitter. Also, optionally, the base unit 16 may include a base unit transmitter to transmit RF signals to one or more cordless speakers 20. The base unit 16 is connected to an AC power source, and is connected to a telephone network via jack 22. In use, the signals received from the cordless microphone 12 are ultimately transmitted to the telephone network, and the signals received on the telephone network are ultimately reproduced as audio on the speaker in the base unit 16 and/or one or more cordless speakers 20.

The base unit 16 may also be provided with many features commonly known in the art. For example, preferably, the speaker on the base unit 16 can be muted and can also be used for initiating and receiving telephone calls, where a numeric keypad is provided. Further, the base unit 16 may also include 'audio out' connections for connection to a 'line in' jack of a conventional sound system, thereby providing corresponding electrical audio signals to the sound system as well and allowing the telephone conversation to be heard over the sound system throughout a larger area.

The base unit 16 receives RF signals from transmitter 14 in a user selectable one of a plurality of predetermined frequency channels, and the transmitter 14 is designed to transmit RF signals in a selected one of the predetermined frequency channels using a common transmit security code. Additionally, the transmitter 14 transmits the RF signal to the base unit 16 on a receive frequency of the base unit 16 and is a simplex remote communicating device. Only one transmitter 14 is used within the cordless telephone system to avoid interference between received signals at the base unit 16. This is controlled by setting only a selected one transmitting device for synchronization with the base unit 16.

The cordless speaker 20 includes a receiver to receive the RF signals from the base unit 16, and a speaker and amplifier with a volume control. Cordless speaker 20 may also be provided with jacks for connection to a sound system as described above. The cordless speaker 20 is a simplex remote communicating device which receives the RF signals from the base unit 16 on a transmit frequency of the base unit 16. Unlike the microphone transmitter 14 or handheld/ standheld cordless microphone 11, multiple cordless speakers may be used simultaneously on the cordless phone system, all set to the same channel of the base unit 16 and the same receive security code, without fear of interference.

The SSIU 30 provides duplex communications between the base unit 16 and a sound system 31. The SSIU 30 includes 'audio out' and 'audio in' jacks which connect via cables to a sound system's 'line in' and 'line out' jacks respectively. The sound system's microphone(s) and speaker (s) then become part of the cordless telephone system, substituting for the microphones and speakers in the cordless system with the SSIU 30 transmitting and receiving RF signals to and from the base unit 16 accordingly. The SSIU30 transmits and receives the RF signals on separate channels using separate security codes corresponding to a receive and transmit channel of the base unit 16. The base unit 16 may also optionally include 'audio out' and 'audio in' jacks for direct connection to the sound system 31 from the base unit 16.

A cordless headset 13, including a microphone and ear phone, is also a duplex remote communicating device. The cordless headset 13 is electrically connected to a transceiver 15 and includes a microphone to convert received acoustical signals to corresponding electrical audio signals. The transceiver 15 is adapted to be worn by the presenter and receives the electrical audio signals and converts the electrical audio signals to RF signals and transmits the RF signals to the base unit 16. The transceiver 15 also receives RF signals from the base unit 16, and converts them to electrical audio signals for broadcasting by the earphones in the cordless headset 13. The transceiver transmits and receives the RF signals on separate channels using separate security codes corresponding to a receive and transmit channel of the base unit 16. The transceiver 15 may also optionally include a keypad 15a to facilitate call setup functions on the base unit 16 from a remote location.

The system illustrated above is subject to the limitation of supporting a maximum of one transmitting remote communicating device, such as a cordless microphone 11, 12, cordless headset 13 (microphone portion), and SSIU 30 ('audio in' portion), while supporting multiple receiving remote communicating devices, such as cordless speakers 20, cordless headset 13 (earphone portion), and SSIU 30 ('audio out' portion).

The cordless telephone system of FIG. 1 provides low cost simplex communications between the base unit 16 and a number of specialized remote communicating devices. Even the duplex devices are a combination of a specialized transmitting remote communicating device with a specialized receiving remote communicating device. The receiving remote communicating devices must be set to the same receiving security code as the base unit 16 and only one transmitting remote communicating device may be set to the same transmitting security code as the base unit 16, to prevent interference.

Figure 2:
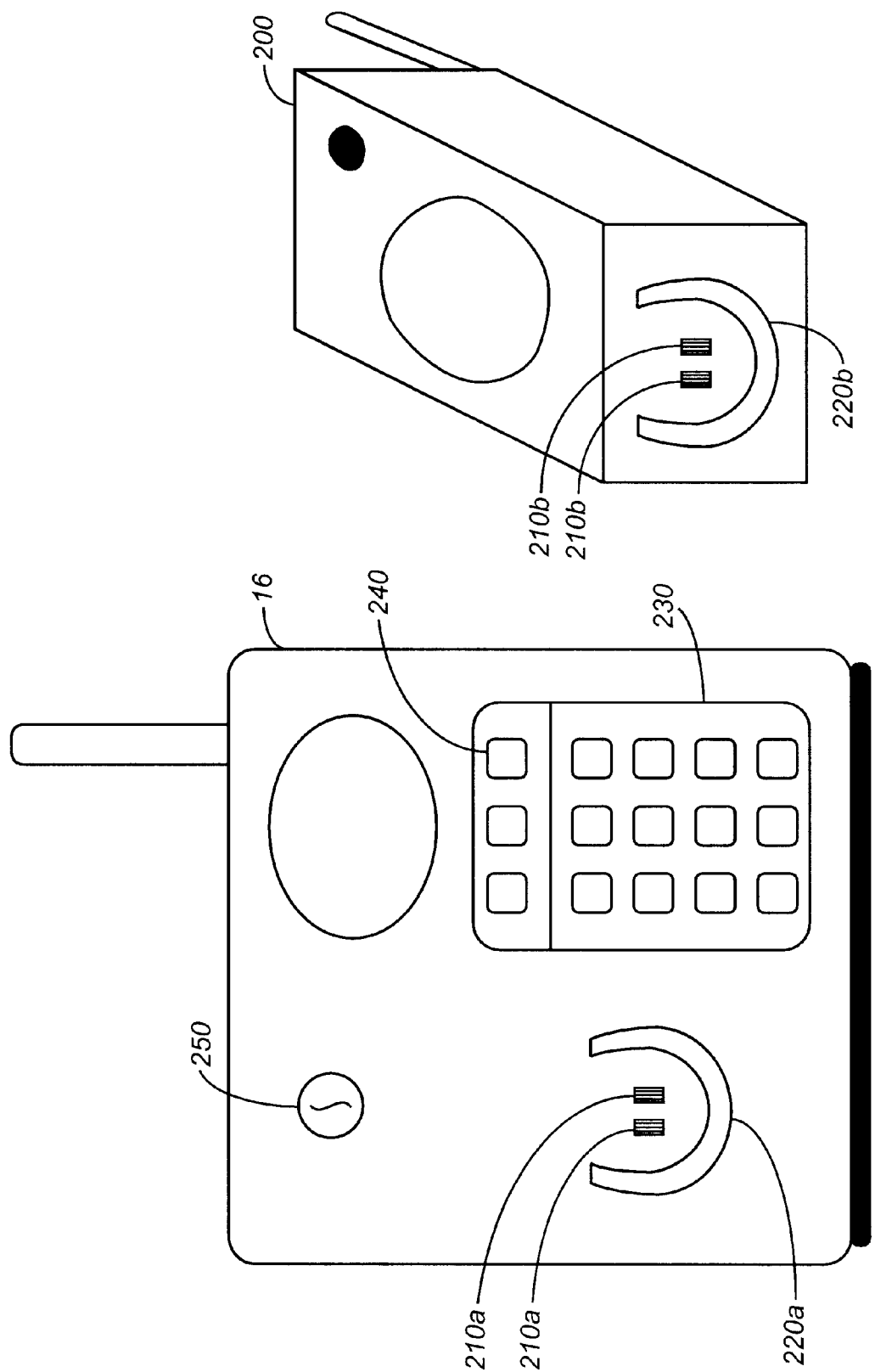
FIG. 2 illustrates a base unit and remote communicating device for having means for setting security codes in accordance with the method of the present invention.

FIG. 2 illustrates a base unit 16 and remote communicating device 200 using a method of setting security codes in accordance with the present invention. Referring to FIG. 2, a remote communicating device 200 represents any one of the remote communicating devices shown in FIG. 1, namely the microphone 11, transmitter 14 for microphone 12, cordless speaker 20, SSUI 30, handheld/standheld cordless microphone 11, or transceiver 15 for cordless headset 13. The base unit 16 includes contacts 210a which correspond to contacts 210b on the remote communicating device 200. The security code setting procedure executes when the remote unit 200 physically contacts the base unit 16; more specifically, when the remote communicating device's contacts 210b are electrically connected to the base unit's contacts 210a. The security code data is transmitted from the base unit 16 to the remote communicating device 200 via the corresponding contacts 210a, 210b.

The remote communicating device 200 is properly aligned with the base unit 16 via mating supporting structures. For example, the base unit 16 may include a horseshoe shaped raised supporting member 220a on its top which aligns with a corresponding horseshoe shaped inset 220b on one side of the remote communicating device 200, such that when the remote communicating device 200 is inserted onto the base unit 16, the corresponding contacts 210a, 210b are aligned and therefore electrically connected. Many other supporting structures may be contemplated, serving the same function.

The base unit 16 may also include a keypad 230 with an optional reset button 240 and may include a reset key switch 250 which accepts a key for added security. The reset button 240 or the reset key switch 250 serves to increment or randomize the receiving security code in the base unit 16. That is, the security code that is commonly used by all receiving remote communicating devices, such as the cordless speakers 20, transceiver 15 for cordless headset 13 (earphone portion), and SSIU 30 ('audio out' portion), and the base unit 16 is changed by a user only by pressing the reset button 240 or turning the reset key switch 250. The receiving security code may also optionally be changed by the user via the keypad 230 after entering an access code. The transmitting security code is randomized and set automatically by the base unit 16, as described further below.

Figure 3:
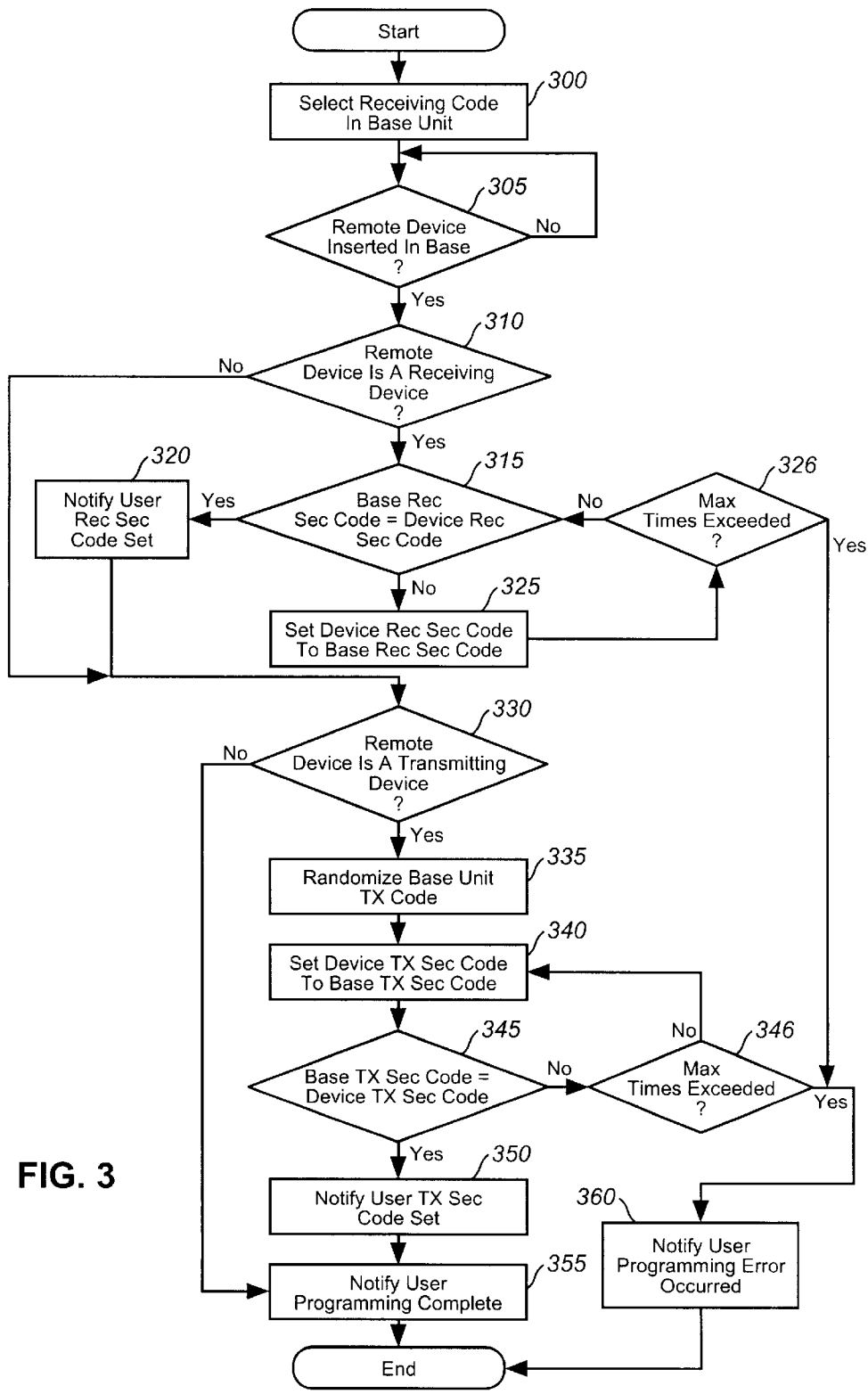
FIG. 3 is a flow chart illustrating a method of setting security codes in the remote communicating devices of the cordless telephone system of FIG. 1 in accordance with an embodiment of the present invention.

FIG. 3 is a flow chart illustrating a method of setting security codes in the remote communicating devices of the cordless telephone system of FIG. 1 in accordance with an embodiment of the present invention. Referring to FIG. 3, a method of setting security codes in a cordless telephone system includes selecting a new receiving security code at the base unit 16 in step 300. As described above, the reset button 240 or the reset key switch 250 serves to increment or randomize the receiving security code in the base unit 16. That is, the security code that is commonly used by all receiving remote communicating devices, such as the cordless speakers 20, transceiver 15 for cordless headset 13 (earphone portion), and SSIU 30 ('audio out' portion), and the base unit 16, is changed only by a user by pressing the reset button 240 or turning the reset key switch 250. The receiving security code may also optionally be changed by the user via the optional keypad 230 after entering an access code. The user may also choose to use the receiving security code currently set in the base unit 16, eliminating step 300.

In step 305, the base unit 16 determines when a remote communicating device 200 is positioned onto the base unit 16, that is, whether the remote communicating device's contacts 210*b* are in electrical contact with the base unit's contacts 210*a*. This may be determined by periodically polling, for instance once a second, the base unit's contacts 210*a* for the presence of a remote communicating device 200 and awaiting a response to the polling from the remote communicating device 200. Another possible method is to detect a change in current between the base unit's contacts 210*a* when the remote communicating device 200 is positioned onto the base unit 16.

In any case, once the presence of remote communicating device 200 is detected, the base unit 16 next determines at step 310 if the remote communicating device 200 is, partially or wholly, a receiving device using, for example, the polling or current sensing method above. That is, whether the remote communicating device 200 performs receiving functions, such as the cordless speakers 20, transceiver 15 for cordless headset 13 (earphone portion), and SSIU 30 ('audio out' portion), and the base unit 16, and therefore requires a receiving security code. If the base unit 16 determines the remote communicating device 200 is a receiving device in step 310, the base unit 16 next compares the current base unit receiving security code to the receiving security code currently set in the remote communicating device 200, in step 315. If the base unit 16 determines the current base unit receiving security code is the same as the receiving security code currently set in the remote communicating device 200, the base unit 16 notifies the user that the current receiving security code is set via an audible or visual notification in step 320. A small speaker, light emitting diode (LED), or liquid crystal display (LCD) may be included in the base unit 16 for this purpose. If instead, in step 315, the base unit 16 determines the current base unit receiving security code differs from the receiving security code currently set in the remote communicating device 200, the base unit 16 communicates the new receiving security code to the remote communicating device 200 via the corresponding contacts 210*a* and 210*b*, in step 325. The base unit 16 then again compares the current base unit receiving security code to the receiving security code currently set in the remote communicating device 200 for verification purposes by returning to step 315, and upon verification, to step 320 to notify the user that the current receiving security code is set. This procedure continues until the codes are determined to be the same in step 325 or a maximum number of retries have been exceeded in step 326. If the maximum number of retries, for instance three, have been exceeded in step 326, the base unit 16 notifies the user an error has occurred in step 360, again using an LED, LCD or speaker, and the procedure ends.

However, if in step 310 the base unit 16 determines the remote communicating device 200 is not a receiving device or after notifying the user that the current receiving security code is set in step 320, the base unit 16 next determines whether the remote communicating device 200 is a transmitting device in step 330. This determination is made by the base unit 16 by again using, for example, the polling or current sensing method above. However, here the result returned by the transmitting remote communicating device 200 differs from the result returned by the receiving remote communicating device 200 so the base unit 16 may properly differentiate the two. That is, the base unit 16 determines if the remote communicating device 200 is, partially or wholly, a transmitting device performing transmitting functions, such as a cordless microphone 11, transmitter 14 for microphone 12, transceiver 15 for cordless headset 13 (microphone portion), and SSIU 30 ('audio in' portion), and therefore requires a transmitting security code.

If the base unit 16 determines the remote communicating device 200 is a transmitting device in step 330, the base unit 16 next randomly selects a new active transmitting security code from a list of possible security codes stored in the base unit 16, in step 335. This randomization of the transmitting security code helps insure that no two transmitting remote communicating devices are transmitting using the same security code simultaneously, enabling only one transmitting device to transmit and thereby eliminating possible interference. Next, the base unit 16 communicates the new active transmitting security code to the transmitting remote communicating device 200 via the corresponding contacts 210*a* and 210*b*, in step 340. If, in step 345, the base unit 16 then verifies the current base unit transmitting security code is the same as the transmitting security code currently set in the remote communicating device 200, the base unit 16 notifies the user that the current transmitter security code is set via an audible or visual notification in step 350. A small speaker, LED, or LCD may be included in the base unit 16 for this purpose.

If instead, in step 345, the base unit 16 determines the current base unit transmitting security code differs from the transmitting security code currently set in the remote communicating device 200, the base unit 16 again communicates the new active transmitting security code to the remote communicating device 200 via the corresponding contacts 210*a* and 210*b*, returning to step 340. The base unit 16 then again compares the current base unit transmitting security code to the transmitting security code currently set in the remote communicating device 200 for verification purposes in step 345. This procedure continues until the codes are determined to be the same in step 345 or a maximum number of retries has been exceeded in step 346. If the maximum number of retries, for instance three, has been exceeded in step 346, the base unit 16 notifies the user an error has occurred in step 360, again using an LED, LCD or speaker, and the procedure ends. Otherwise, after notifying the user that the current transmitter security code is set via an audible or visual notification in step 350, the user is further notified that the procedure has been completed in step 355 and the procedure ends.

However, if in step 330 the base unit 16 determines the remote communicating device 200 is not a transmitting device, the user is notified that the procedure has been completed in step 355 and the procedure ends.

Here, it is also important to note that certain devices contain both receiving and transmitting portions, such as the SSIU 30 and the transceiver 15 for the cordless headset 13, and would therefore have both the transmitting and receiving security codes updated in one operation, performing all the steps of FIG. 3. However, where a user wishes to only set the transmitting security code in the SSIU 30 or transceiver 15 for the cordless headset 13, he or she merely skips step 300, thereby leaving the current common receiving security code setting in the SSIU 30 or transceiver 15 for cordless headset 13. Alternatively, where a user wishes to only set the receiving security code in the SSIU 30 or transceiver 15 for cordless headset 13, he or she subsequently inserts the desired active transmitting device, thereby assigning the current transmitting security code to the desired active transmitting device only in lieu of the SSIU 30 or transceiver 15 for the cordless headset 13.

Additionally, it is important to note that while the method of the present invention has been discussed in conjunction with the cordless telephone system of FIG. 1, the method of the present invention is contemplated to be used with any number of similar communication systems. Further, while the present invention has been described in detail with reference to the preferred embodiments, they represent mere exemplary applications. Thus, it is to be clearly understood that many variations can be made by anyone of ordinary skill in the art while staying within the scope and spirit of the present invention as defined by the appended claims.

What is claimed is:

1. A method of setting security codes in a remote communicating device using a base unit in a cordless telephone system, the method comprising the steps of:

(a) bringing the remote communicating device into electrical contact with the base unit, wherein the base unit stores a transmitting security code and a receiving security code, different from the transmitting security code;

(b) determining whether the remote communicating device is capable of receiving or transmitting or both; and (c) setting the remote communicating device with the receiving security code or the transmitting security code or both based on whether the remote communicating device is capable of receiving or transmitting or both, as determined in step (b).

2. The method recited in claim 1, comprising:

(d) verifying the receiving security code or the transmitting security code or both based on whether the remote communicating device is capable of receiving or transmitting or both, as determined in step (b).

3. The method recited in claim 2, comprising notifying a user of a successful result of said verifying.

4. The method recited in claim 2, comprising notifying a user of an unsuccessful result of said verifying.

5. The method recited in claim 1, comprising receiving a user selection of the receiving security code, thereby setting the same selected receiving security code in step (c).

6. The method recited in claim 5, comprising performing said receiving in response to the user selecting a keypad on the base unit.

7. The method recited in claim 1, comprising randomizing the transmitting security code by the base unit, thereby setting a different transmitting security code in step (c).

8. The method recited in claim 6, comprising performing said randomizing in response to a reset button on the base unit.

9. The method recited in claim 6, comprising performing said randomizing in response to a reset key switch on the base unit.

10. The method recited in claim 1, said bringing the remote communicating device into electrical contact with the base unit includes:

aligning electrical contacts of the remote communicating device with electrical contacts of the base unit.

11. The method recited in claim 7, wherein said determining includes polling the remote communicating device via the electrical connection between the base unit and remote communication device.

12. The method recited in claim 7, wherein said determining includes sensing a change in current at the electrical contacts of the base unit in response to the electrical contact with the remote communicating device.

13. The method recited in claim 1, further comprising the steps of:

verifying the receiving security code via the electrical contact with the base unit;

notifying a user if the receiving security code is successfully set in the remote receiving device; and notifying a user if the receiving security code setting is unsuccessful in the remote receiving device.

14. The method recited in claim 13, said bringing the remote receiving device into electrical contact with the base unit includes:

aligning electrical contacts of the remote receiving device with electrical contacts of the base unit.

15. The method recited in claim 13, wherein the receiving security code is randomized by the user via a reset button on the base unit.

16. The method recited in claim 1, further comprising the steps of:

verifying the transmitting security code via the electrical contact with the base unit;

notifying a user if the transmitting security code is successfully set in the remote transmitting device; and notifying a user if the transmitting security code setting is unsuccessful in the remote transmitting device.

17. The method recited in claim 16, said bringing the remote transmitting device into electrical contact with the base unit includes:

aligning electrical contacts of the remote transmitting device with electrical contacts of the base unit.

* * * * *